United States Patent [19]
Santi

[11] Patent Number: 5,454,293
[45] Date of Patent: Oct. 3, 1995

[54] FILTER-HOLDER BOX TO LOAD A DOSE OF COFFEE INTO THE BREWING CHAMBER OF A COFFEE BREWING MACHINE

[75] Inventor: Giuseppe Santi, Casalecchio di Reno, Italy

[73] Assignee: Euromatik S.r.l., Casalecchio di Reno, Italy

[21] Appl. No.: 204,508

[22] Filed: Mar. 2, 1994

[30] Foreign Application Priority Data

Mar. 17, 1993 [IT] Italy ............................. MI93U0207 U

[51] Int. Cl.⁶ .................................................. A47J 31/06
[52] U.S. Cl. ........................................... 99/289 R; 99/195
[58] Field of Search .................. 99/289 R, 279, 99/286, 289 D, 289 P, 295; 426/433

[56] References Cited

U.S. PATENT DOCUMENTS

| | | | |
|---|---|---|---|
| 3,092,011 | 6/1963 | Gee | 99/289 R |
| 3,390,626 | 7/1968 | Holstein | 99/289 R |
| 3,496,861 | 2/1970 | Stahler | 99/289 R |
| 5,103,716 | 4/1992 | Mikkelsen | 99/289 R |
| 5,110,469 | 5/1992 | Kozloski | 99/289 R |

*Primary Examiner*—Robert W. Jenkins
*Attorney, Agent, or Firm*—Keil & Weinkauf

[57] ABSTRACT

In an espresso coffee brewing machine (1) the filter-holder box (10) is articulated and can be operated by a user through a mechanical linkage (18, 15, 7) suited to moving it between a first closed position under a hot-water distributor (4) and a second open position in which it is distanced at an angle from said distributor (4) so as to present the filter (12) exposed and tilted towards the user that can load a cartridge of coffee into it (FIG. 1).

8 Claims, 3 Drawing Sheets

FILTER-HOLDER BOX TO LOAD A DOSE OF COFFEE INTO THE BREWING CHAMBER OF A COFFEE BREWING MACHINE

TECHNICAL FIELD

The present invention concerns a filter-holder box to load a dose of coffee into the brewing chamber of a coffee brewing machine.

Coffee brewing machines are known into the filter of which a dose of coffee is loaded; this dose may be loose coffee powder or coffee packaged in cartridges, that is in the form of disks comprising coffee powder compressed between walls of permeable paper.

BACKGROUND ART

In a first type of known machine the dose of coffee is loaded into a removable box; the user disengages said box from the machine, places a dose of coffee inside, loose powder or in the cartridge form, so that the dose will be lodged within a brewing chamber defined between a hot water distributing organ and the filter-holder box.

In the following description we shall more simply define said hot-water distributing organ—distributor—and said filter-holder box—box—.

In a second type of machine the dose of coffee is loaded into a nonremovable box, but that features a vertical, or vertical and horizontal movement as a consequence of which the filter is disengaged from the distributor and comes to be horizontally exposed in order to receive the dose of coffee.

In the first type of machine, especially the engagement of the removable box involves an operation that most users find difficult; it often means engaging the box by a number of trials by means of a bayonet device the users cannot see.

In the second type of machine the disengagement and engagement of the box means first operating a lever to vertically release the box, and then on a knob to shift the box horizontally, elementary operations in themselves, but who generally annoy the user that is aware of going through at least four different operations to load and unload a dose of coffee. Moreover, a box devised to be operated as described above does not realize a good fastening and sealing of the dose of coffee within the brewing chamber.

DISCLOSURE OF INVENTION

The box according to the present invention obviates the inconveniences of the state of the art and presents advantages that will be apparent from the description below.

This box is associated to the machine and may not be removed by a user, is fitted within the machine so as to be operated by a user who can move it between a first closed position in which it is fastened under the distributor and a second open position in which it is angled away from the distributor with the filter exposed tilted towards the user to then be shifted from the second position to the first position and be fastened under said distributor with the dose of coffee in the brewing chamber. In addition, in the second position the box may also be shifted, compared to the closed position, horizontally towards the front of the machine, jutting out towards the user.

It is evident that said box is particularly suited to receiving a cartridge of coffee, but it may also be used in a machine with a filter made to receive a dose of loose coffee powder and that the opening and closing movements may be given by means of a manual system of jointed shafts and a control lever or by means of a system of jointed shafts and electric motor.

The main advantages of said box lie in the fact that it is operated with a single closing action and a single opening action, and that, being tilted towards the user and well distanced from the distributor it is comfortable and inviting to use.

BRIEF DESCRIPTION OF DRAWING

In order to better understand the box a preferred embodiment is described with reference to the attached drawings in which.

BEST MODE FOR CARRYING OUT THE INVENTION

The embodiment illustrated concerns a machine that brews coffee from a coffee cartridge and that has a manually operated box.

Figure 1:
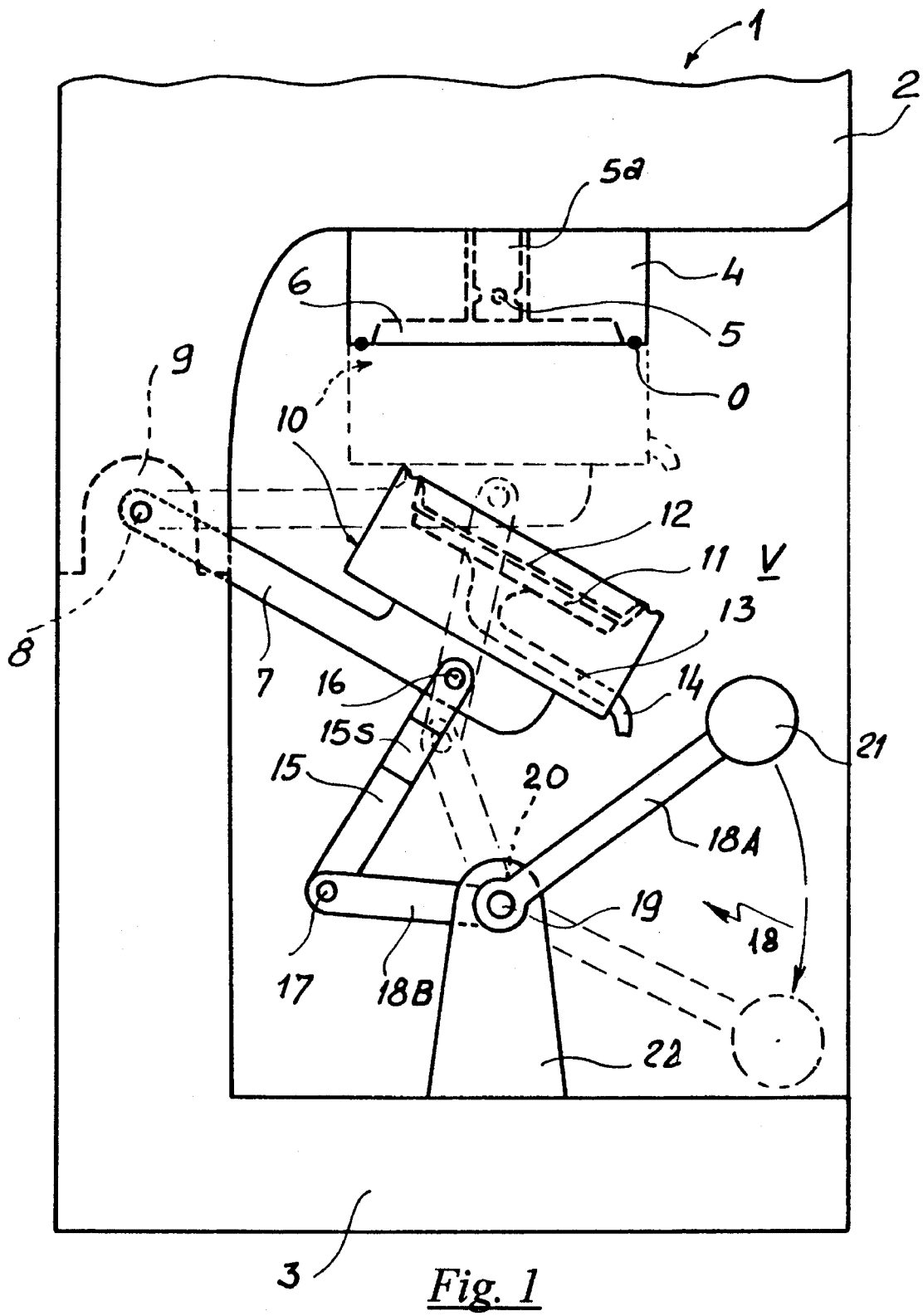
FIG. 1 is a side view, and, FIG. 2 and FIG. 3 are frontal views.

FIG. 1 shows part of a coffee brewing machine 1 with its casing 2 and base 3; in vane V between the lateral and back walls of the machine the distributor 4, the box 10 and the mechanism operating the box are lodged. The distributor is fed hot water produced by conventional means such as a heat exchanger or a boiler; the hot water exits from holes 5 of a "shower" 5a and fills chamber 6 when box 10, with a cartridge (not shown) placed on the filter (12—FIG. 2), is fastened against distributor 4 with hydraulic sealing ensured by an O-ring gasket. -O An arm 7 has one end jointed to a pivot 8 held by a bracket 9 solid with the casing of the machine while the other end is part of the lower part of box 10.

The latter comprises a chamber 11 above that, together with said chamber 6, forms the brewing chamber of the machine; in chamber 11 a conventional filter 12 is lodged upon which a coffee cartridge may be positioned. On the bottom of chamber 11 there is the opening of a duct 13 that opens out into a beak 14 from which the brewed coffee falls into a cup (not shown). On two sides of said lower part 7 of box 10 two ends 15s and 15d are jointed in 16 (the figure shows only 15s) of a fork 15 that has its lower part jointed in 17 on two bars 18b that are part of a first type of lever 18 that is hinged in 19. The 18a arm of lever 18 leads to knob 21 representing the point of application of the user action. As can be seen from the two figures together, lever 18 does not lie on a plane; the lever is constructed on a horizontal shaft 20 that rotates between two parallel and distanced supports 22. Half-way along these supports 22, shaft 20 has the two parallel arms 18B welded on (FIG. 1 only shows one) that are part of lever 18.

The figure shows how in the open position box 10 is presented at a distanced angle from distributor 4, in a forward and tilted position towards the front of the machine, so as to present the filter plane 12 inviting the positioning operation of a cartridge. It is also obvious that when a user pushes knob 21 downwards, box 10 moves upward according to the arc set by arm 7 to reach the distributor in the position suited to fastening against the latter so as to form the brewing chamber (the parts in the closed position are shown by broken lines).

Figure 2:
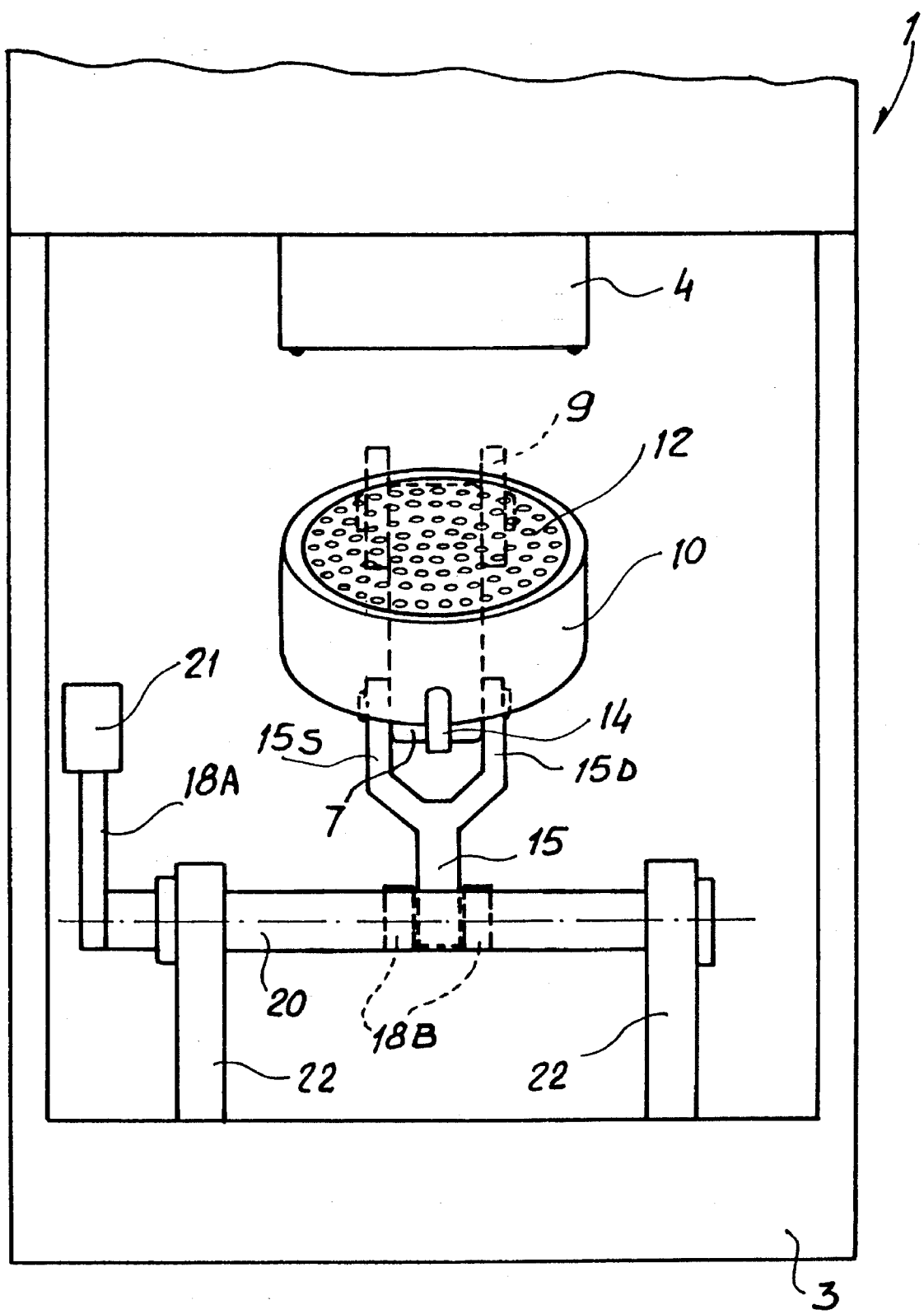

FIG. 2 contributes to illustrating the construction of lever 18, with its parts 18*a* and 18*b* that are solid with arm 20 and control fork 15 that is jointed with ends 15*s* and 15*d* onto lower part 7 of box 10. Moreover, it highlights how filter 12 is conveniently presented so as to receive a cartridge of coffee.

Figure 3:
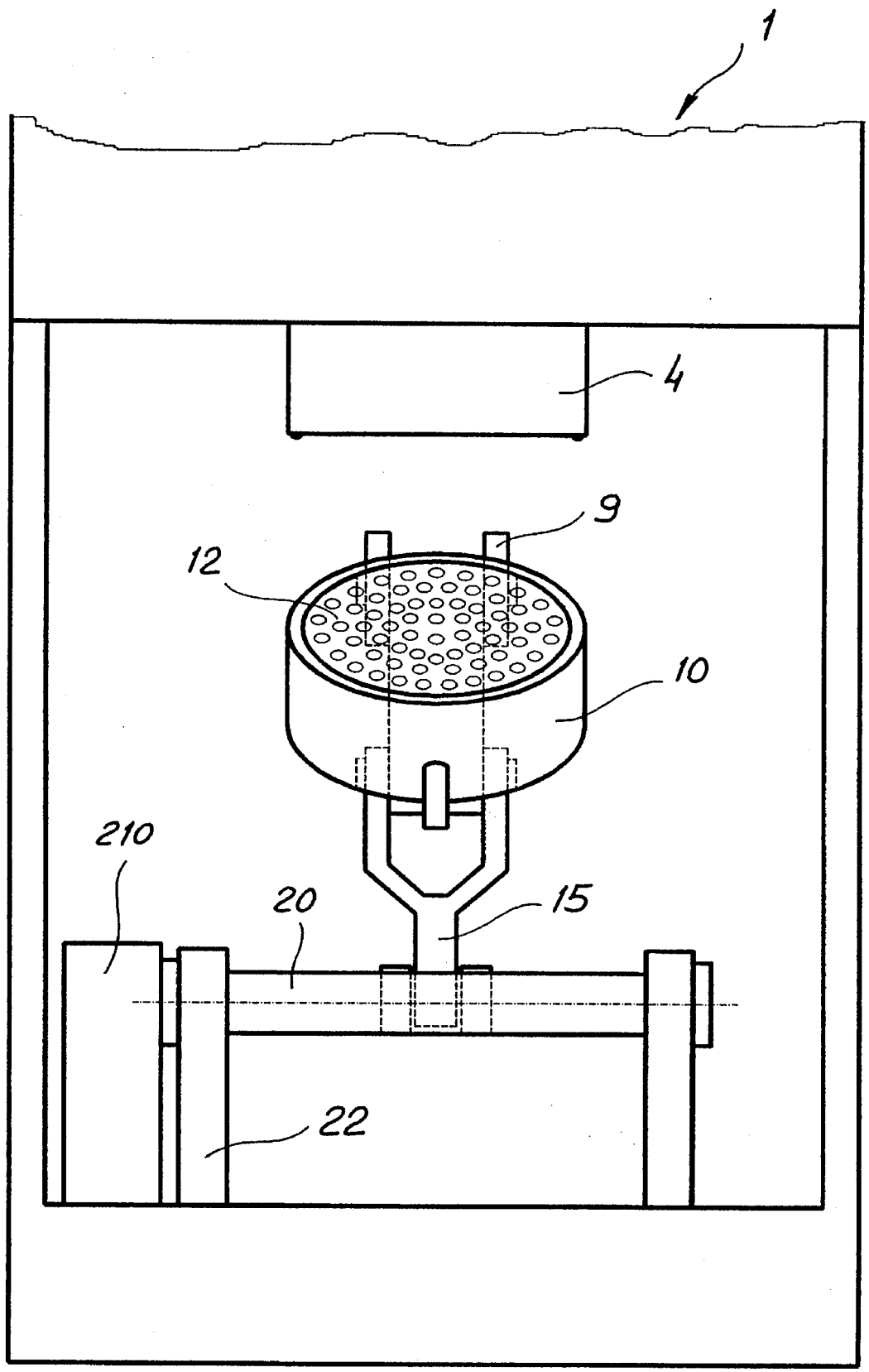

FIG. 3 shows an electric motor 210 that is adapted to work as motor means for dragging the filter-holder box (10) downward or upward.

We claim:

1. A filter-holder box for a coffee brewing machine having a brewing chamber, said filter-holder box serving to load a dose of coffee into said brewing chamber, said filter-holder box being articulated within the machine and a mechanical linkage being operatively connected to said filter-holder box to move said filter-holder box from a first closed position in which it is fastened under the hot water distributor to a second open position in which it is distanced at an angle from said distributor with the filter exposed and tilted towards the user, so as to be supplied with a dose of coffee and then moved from said second position to said first position again under said distributor with the dose of coffee in place on the filter.

2. A filter-holder box according to claim 1, articulated within the machine so that in said second position it is moved horizontally towards the front of the machine, tilted towards the user.

3. A filter-holder box according to claim 2, wherein the means with which it is articulated within the machine include an arm that has one end fixed to the box and the other end articulated to a fixed support so that the filter-holder box moves along an arc and that the means with which it is operated comprise an actuating means that will drag the filter-holder box downward or upward through a linking element that has one end joined to said box and the other end moved upward or downward by said actuating means.

4. A filter-holder box according to claim 3, wherein said actuating means is a lever to be manually operated.

5. A filter-holder box according to claim 3, wherein said actuating means is an electric motor.

6. A filter-holder box according to claim 1, wherein the means with which it is articulated within the machine include an arm that has one end fixed to the box and the other end articulated to a fixed support so that the filter-holder box moves along an arc and that the means with which it is operated comprise an actuating means that will move the filter-holder box downward or upward through a linking element that has one end jointed to said box and the other end moved upward or downward by said actuating means.

7. A filter-holder box according to claim 6, wherein said actuating means is a lever (18) to be manually operated.

8. A filter-holder box according to claim 6, wherein said actuating means is an electric motor.

* * * * *